March 31, 1964     H. H. BORUP     3,127,304
BALANCED-STRESSED COMPOSITE STRUCTURE PANEL AND METHOD FOR SAME
Filed Nov. 2, 1962     2 Sheets-Sheet 1
FIG-1-
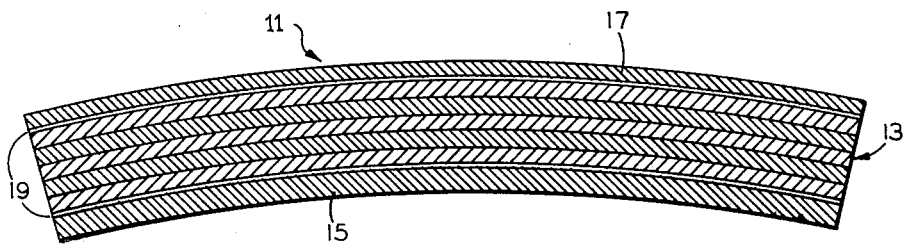
FIG-2-
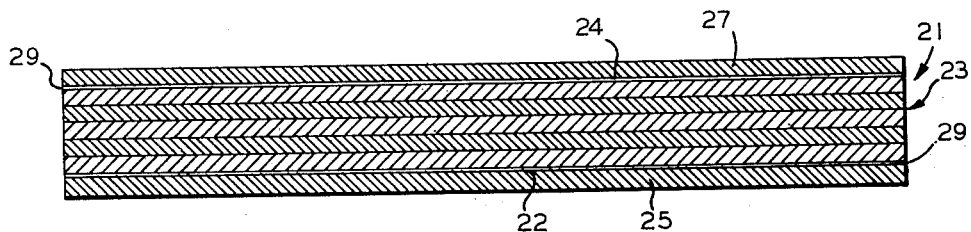
FIG-6-
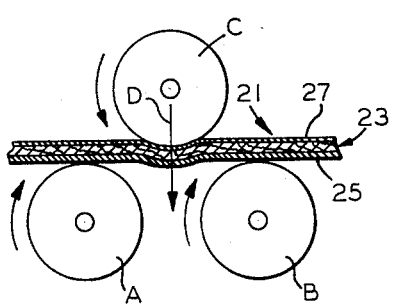
INVENTOR.
HERBERT H. BORUP
BY James E. Toomey March 31, 1964 H. H. BORUP 3,127,304
BALANCED-STRESSED COMPOSITE STRUCTURE PANEL AND METHOD FOR SAME
Filed Nov. 2, 1962 2 Sheets-Sheet 2
FIG-3-
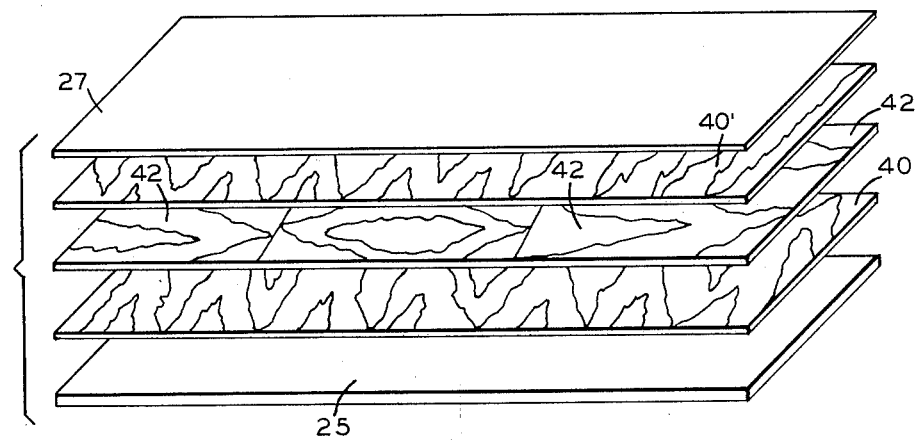
FIG-4-
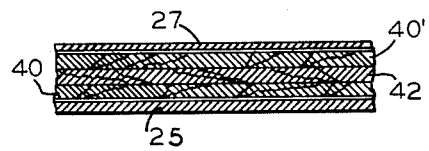
FIG-5-
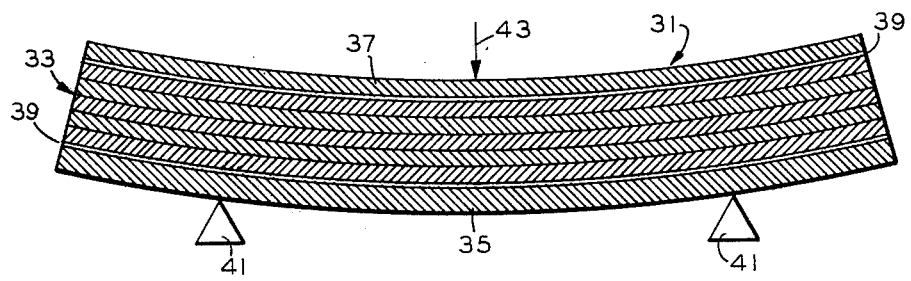
INVENTOR.
HERBERT H. BORUP
BY ID# United States Patent Office 3,127,304
Patented Mar. 31, 1964

3,127,304
BALANCED-STRESSED COMPOSITE STRUCTURE PANEL AND METHOD FOR SAME
Herbert H. Borup, Concord, Calif., assignor to Kaiser Aluminum & Chemical Corporation, Oakland, Calif., a corporation of Delaware
Filed Nov. 2, 1962, Ser. No. 234,989
17 Claims. (Cl. 161—56)

This invention relates to a composite structural panel and to a method of making the same. More particularly, it relates to a structural panel which, after manufacture, will maintain a substantially flat or other desired configuration. This application is also a continuation-in-part of my previously filed application Serial No. 106,275, filed April 28, 1961, and now abandoned, and a continuation-in-part of my previously filed application Serial No. 202,218, filed June 13, 1962, and now abandoned.

One type of structural panel in frequent use today has metal members or laminates attached by hot or cold bonding to opposite surfaces of a suitable core so that both sides of the core have a metal covering with the metal laminates being bonded to the core by means of a suitable adhesive and forming a composite structural panel. In the case where metal members or laminates are hot bonded to each side of a substantially flat core and exert substantially equal forces on both sides of the core after heating and cooling steps of the bonding process have been performed, a state of equilibrium will be reached in which the final configuration of the panel will be substantially flat.

One possible method of making a hot bonded panel having a substantially flat configuration and with the forces balanced is by providing metal members of the same thickness, composition and temper, bonded to opposing sides of the core. To have identical metal coverings on opposing sides of the core is expensive and to do so only as a means of balancing forces in the panel to attain a flat panel is economically impractical. For many commercial applications it is sufficient for a composite panel structure to have only one of the metal laminate surfaces of a substantial thickness to provide the proper metal clad surface required. In such cases, it may be sufficient to provide the opposite surface with a metal laminate material of considerably less thickness, such as foil stock. In manufacturing panels by hot bonding a comparatively thick metal laminate to one surface of the core and a comparatively thin metal laminate to the opposite core surface, considerable difficulty is encountered in preventing undesirable warping of the final composite structure.

This problem of the undesirable warping and bowing of such panels where metallic laminates of different thicknesses are hot bonded to a nonmetallic core is due to the unequal forces applied to the core by virtue of the tendency for expansion or contraction of the adhesively secured metallic and nonmetallic layers. Hot bonding, as the term is conventionally used in the art, refers to a procedure wherein the individual layers making up the product are assembled together with a suitable heat-sensitive adhesive interposed between the layers. The layers as assembled above are then forced together under the application of heat and pressure such as by being placed between heated platens and pressed together. The pressures used in this hot bonding are usually in excess of about 100 p.s.i. and the temperatures are substantially above ambient or room temperature, e.g., 140° to 400° F. Heat and pressure are applied for a predetermined period in order to cause the adhesive to satisfactorily bond the layers. After bonding, the laminated product is allowed to cool to ambient temperature.

The principal reason why the aforesaid undesirable warping and bowing occur is due to the fact that the metallic and nonmetallic components of such a panel tend to expand and contract in different amounts during cooling by virtue of their different coefficients of expansion and contraction. This results in the forces applied to opposing sides of the panel being ultimately balanced, but with the panel having an undesirable configuration.

In general, this invention relates to a composite structural panel which has metal members of different thicknesses and tensile yield strengths hot bonded to opposite major faces or sides of a suitable force-responsive core. Because of preselected differences in the thickness and tensile yield strength of the metal members, a predetermined relationship of forces exerted upon or transmitted to the core by each metal member will be established. Thus, by selection of materials according to the invention, the final configuration of the hot bonded laminated product can be effectively controlled.

The various purposes and advantages of the instant invention will be more apparent from a review of the following detailed description when taken in conjunction with the accompanying drawings wherein:

FIGURE 1 is an elevation sectional view of a panel made in a manner not in accordance with this invention;

FIGURE 2 is an elevation sectional view of a substantially flat panel constructed in accordance with this invention;

FIGURE 3 is an exploded perspective view of a relatively long panel having a plywood core made in accordance with the instant invention;

FIGURE 4 is a fragmentary cross-sectional view of the finished panel shown in FIGURE 3;

FIGURE 5 is a schematic elevation sectional view of another panel constructed in accordance with this invention; and FIGURE 6 is a schematic view of one arrangement for balancing the forces applied to opposing sides of a panel of the instant invention.

Metal members are thermally responsive and will expand when heated and contract when allowed to cool. The extent to which a metal member will expand when heated is related to the coefficient of expansion of the metal material and to the temperature. If a restraining force is exerted on a heated metal member in the thermally expanded condition so that upon cooling the metal member is not permitted to contract, internal stresses will develop in the metal. When the magnitude of the restraining force exerted on the metal exceeds the metal's tensile yield strength, permanent deformation of the metal member will begin and the force which the metal member can exert on the core for all practical purposes becomes constant or fixed. Internal stresses are developed in a metal laminate by thermally expanding the laminate as in hot bonding and preventing contraction (restoration to its original form) upon cooling. In the panel manufacture, the metal laminates are prevented from contracting upon cooling by having been firmly or non-shiftably bonded or anchored in the thermally expanded condition to a core. Ordinarily, if a hot bonded panel is made with a metal member on only one side of the core, or if metal members applied to both sides of the core, such as a plywood core, are not of identical thickness and metallurgical characteristics, the panel will automatically tend to warp or bow after cooling substantially below the bonding temperature reached during the hot bonding process because of the different forces exerted on opposite sides of the core by the metal members.

In FIGURE 1, for example, a panel 11 is shown having a first metal member 15 and a second metal member 17 bonded by adhesive 19 to opposite sides of a core, such as a plywood core 13. The first metal member 15 is of the same metallurgical properties as the second metal member 17, but has a greater thickness. When the metal members 15 and 17 are hot bonded to opposite sides of the core 13 at an elevated temperature the members 15 and 17 with their high coefficients of expansion are thermally expanded a predetermined amount, while the core 13 due to its comparatively low coefficient of thermal expansion is expanded by a comparatively small amount. Thus, on cooling, the members 15 and 17 exert different forces on the core as will be indicated more fully hereinafter, and consequently the hot bonded panel will be bowed as illustrated until these forces are equalized.

It should be apparent from the above that the problems of warping and bowing in composite panel manufacture are not encountered in manufacturing processes which do not employ elevated temperatures. Thus, for example, if the laminates are "cold" bonded flat, there will be no disturbance of the balance of forces present in the flat panel and the final laminated product will still be flat. In hot bonding, however, the use of temperatures substantially above ambient temperature, e.g., 50°–75° F. (or higher) above ambient temperature, and the application of a restraining force upon cooling can result in changes in the balance of forces of the composite panel components and consequently in undesirable changes in the configuration of the panel. However, if, in accordance with the invention, the properties of the metal members are so selected that the relationships of the forces exerted by the metal members on the core are controlled in a predetermined manner, a structural panel having the desired configuration at ambient temperature will be produced.

It is found that after the heating and cooling steps of the hot bonding process, the force applied by a metal member on the core is proportional to the stress and the thickness of the metal member. This is shown as follows: Where "F" represents the force on a core exerted by a metal member upon cooling, "A" is the cross-sectional area of the metal member, "s" is stress in the metal member, "l" is the length of the metal member and "t" is thickness of the metal member.

$$F = sA$$
$$A = lt$$
$$\therefore F = slt$$
$$\therefore F \propto t$$

Also, if
$$F_1 = F_2$$
$$s_1 l_1 t_1 = s_2 l_2 t_2$$

but as
$$l_1 = l_2$$
$$\therefore s_1 t_1 = s_2 t_2$$

∴ in order to have the forces balanced in a composite panel having a predetermined configuration, the ratio of the stresses must be equal to the inverse ratio of the thicknesses. Thus, in using two metal members of different thicknesses, the thicker metal member, according to the invention, must always have a lower tensile yield strength than the thinner metal member to enable the forces applied to opposing sides of a composite panel having a predetermined configuration to be balanced. The final total stresses in each of the metal laminates can be theoretically controlled to produce a balance of the aforesaid forces by restraining expansion of the metal laminates (during heat-up to hot bonding temperature) or contraction of the metal laminates (upon cooling). The invention contemplates selecting materials for the thick and thin metal laminates so that the tensile yield strength of one laminate can be exceeded without exceeding the tensile yield strength of the other. By exceeding the tensile yield strength of one laminate, the maximum force that that laminate can exert upon the core is fixed at a predetermined level which is still within the range of force attainable and exertable by the metal laminate on the opposite surface of the core. Thus, if a flat panel is desired using laminates of unequal thickness, the materials and thicknesses are chosen, according to the invention, so that the thick laminate has a lower tensile yield strength than the inner laminate and the force exerted by the thick laminate and the force exerted by the thin laminate will be balanced when the panel has the desired configuration.

FIGURE 2 shows a hot bonded substantially flat composite structural panel 21 made in accordance with a preferred embodiment of this invention, and provided with a core 23 having a first side 22 and an opposing second side 24. A comparatively thick first metal member 25 is attached to the first side 22 by a thermo-reacted adhesive bonding material or glue line 29 and a comparatively thin second metal member 27 is attached to said second side 24 by a thermo-reacted adhesive bonding material 29. Adhesive bonding material or glues which have been found to be suitable are thermo-setting continuous films of phenolic formaldehyde resins supported on a cellulosic carrier, and which set at temperatures between 250°–325° F.

In this particular embodiment of the invention shown in FIGURE 2, the core 23 can be made of plywood and the metal members 25 and 27 can be made of any suitable aluminum or aluminum alloy material. The first metal member 25 comprises a comparatively thick sheet member having a temper and composition such that it has a comparatively low tensile yield strength while the second metal member 27 can be comparatively thin aluminum alloy foil which has a temper and composition such that it has a comparatively high tensile yield strength. In the aluminum industry the dividing line between sheet and foil is .006″. Thus, aluminum and aluminum alloy materials having a gauge or thickness of .006″ and above are considered to be "sheet" and aluminum and aluminum alloy materials having a thickness below .006″ are considered to be "foil."

During the hot bonding process the metal members 25 and 27 are heated and thereby expanded by an amount related to the temperature reached and are simultaneously bonded by a thermosetting adhesive to opposite sides 22, 24 of the core 23 while in this expanded condition. Upon cooling of the core 23 and the metal members 25 and 27 to ambient temperature, predetermined forces are exerted by the metal members 25 and 27 on the respective sides 22 and 24 of the core 23 and the metal members are in a stressed condition. The composition, thickness and temper of the metal members 25 and 27 have been selected so that on cooling after hot bonding, member 25 is advantageously stressed beyond its tensile yield strength and is permanently deformed. This permanent deformation results in a relatively low stress in member 25 as compared to the high stress in the thin metal member 27 with the result that the forces exerted by both members 25 and 27 on core 23, because of the inversely proportional difference in thickness of the metal members, are substantially equal and balanced when the panel is in the desired flat configuration.

By virtue of this balancing of forces, the core itself can be said to be uniformly stressed throughout and maintained in this stressed condition such that full advantage can be taken of the load-bearing characteristics of the core member itself in contrast to a laminated product made by cold bonding or other techniques heretofore known to the art for making panels with laminates of unequal thicknesses.

Typical examples of this invention are shown in Table I. These examples are of flat panels having plywood cores with the first and second metal members, 25 and 27, being made from aluminum alloys as set forth.

In all of the following examples aluminum alloy laminates were used and in examples (a), (b), (d) and (e) a 4 foot by 8 foot by ½ inch, 5-ply CD grade Douglas fir plywood core was used; in example (c) a 4 foot by 8 foot by ⅜ inch 3-ply CC grade plywood core was used. The thermosetting adhesive resin used was a continuous film of phenolic formaldehyde resin on a cellulosic carrier. While in typical hot bonding processes the specific temperatures employed can vary above 140° F., preferred temperatures are in the range of 270°–320° F. and the preferred pressures are between 175 p.s.i. and 215 p.s.i. The hot bonding in the examples was done in a hot bonding press by applying a pressure of about 200 p.s.i. for examples (a–d) and 215 p.s.i. for (e), for about seven minutes at a temperature of about 275° F. for examples (a), (b), (c) and (e) and 290° F. for (d). The panels were cooled between supports with the thicker metal member facing downward. Therefore, the thicker metal member contributed as a weight ot the forces acting on the panel. In examples (d) and (e) additional 100-lb. weights were placed in the center of the panel during cooling for reasons more fully discussed hereinafter in connection with FIGURE 5. In all these examples the thicker metal member was permanently deformed to provide a balance of the forces applied to opposite sides of the core by the metal members and with the panel being substantially flat. Nominal compositions for the alloy designations are given in Schedule A.

*Schedule A*

| Alloy Designation | Si | Fe | Cu | Mn | Mg | Cr | Zn | Ti | Other Each | Other Total | Balance |
|---|---|---|---|---|---|---|---|---|---|---|---|
| 1100 | 1.0 | +Fe | 0.20 | 0.05 | | | 0.10 | | 0.05 | 0.15 | Aluminum. |
| KBS | 0.30 | 0.5–0.7 | 0.10–0.20 | 1.0–1.20 | 0.30–0.50 | 0.10 | 0.20 | 0.10 | 0.05 | 0.15 | Do. |
| 3003 | 0.6 | 0.7 | 0.20 | 1.0–1.5 | | | 0.10 | | 0.05 | 0.15 | Do. |
| 5052 | 0.45 | +Fe | 0.10 | 0.10 | 2.2–2.8 | 0.15–0.35 | 0.10 | | 0.05 | 0.15 | Do. |
| 5005 | 0.40 | 0.7 | 0.20 | 0.20 | 0.50–1.1 | 0.10 | 0.25 | | 0.05 | 0.15 | Do. |
| 3004 | 0.30 | 0.7 | 0.25 | 1.0–1.5 | 0.8–1.3 | | 0.25 | | 0.05 | 0.15 | Do. |

NOTE: Composition in percent maximum unless shown as a range.

*Table 1*

| First Metal Member | | | Second Metal Member | | |
|---|---|---|---|---|---|
| Alloy | Thickness, in. | Tensile Yield Strength lbs./in.$^2$ | Alloy | Thickness, in. | Tensile Yield Strength lbs./in.$^2$ |
| (a) 3003-H12 | 0.010 | 18,000 | 5052-H38 | 0.002 | 37,000 |
| (b) 5005-H32 | 0.010 | 17,000 | 3004-H38 | 0.002 | 36,000 |
| (c) 3003-H-114 | 0.0126 | 13,000 | 5052-H38 | 0.0035 | 37,000 |
| (d) KBS-H-154 | 0.012 | 21,000 | 1100-H18 | 0.003 | 22,000 |
| (e) KBS-H-154 | 0.012 | 21,000 | 1100-H18 | 0.003 | 22,000 |

On the basis of these examples and other tests and calculations made it has been found that preferred thicknesses of metal members when they consist essentially of aluminum and aluminum alloys should be as follows:

(1) The first metal member preferably should have a thickness from about three to six times the thickness of the second metal member; or (2) Stated another way, the first metal member preferably should have a thickness between about 0.072 inch and 0.010 inch, and between three and six times the thickness of the second metal member which is between about 0.024 inch and 0.017 inch. It is to be understood, of course, even though the preferred thickness ranges of the thicker and thinner metal member overlap, that when used in a particular application the thicker metal member will always be thicker relative to the other metal member.

When used in the specification and claims of this application, the following definitions are used:

Tensile yield strength is the stress at which a material exhibits a specific permanent set due to tensile forces.

Stress is the force per unit area within a body which resists a change in shape.

At times it may be necessary to make compensation for conventional mill tolerances of thickness and tensile yield strengths of the metal laminates and at other times it may be impractical to use the specific materials which calculations show are the optimum materials for a given set of conditions. Accordingly, in such cases it may be necessary to permanently deform one of the metal members more than would occur by cooling the same. This final adjustment or control is accomplished by further permanently deforming one of the metal members by the application of an external force thereto in order to provide a finished panel with a substantially flat or other desired configuration. One method of providing this final adjustment and control is schematically indicated in FIGURE 5 and a further method is shown in FIGURE 6. As indicated in FIGURE 5, a panel 31, having a first relatively thick metal member 35 and a second relatively thin metal member 37 bonded to a core 33 by adhesive bonding material 39 of the type noted above, is supported preferably during the cooling portion of the bonding operation adjacent a pair of opposing marginal edges by supports schematically indicated by triangles 41 on the side to which the first metal member 35 is bonded. The panel 31 is subjected to an external force indicated by arrow 43 on the other side, which in one embodiment represents weights or levers exerting a force in a direction substantially normal to the core, at the point where the force was applied, as was the case in examples (d) and (e) in Table I. This additional external force enhances the control of the forces applied to the core 33 by the metal members 35, 37 during the cooling steps and allows final adjustment and correction so that these forces are maintained in a predetermined balanced relationship to produce a predetermined configuration of the final product. The additional external force may be applied to either side as desired and to at least one side. On some occasions, as mentioned above in connection with Table I, the weight of the thicker metal member may be used to provide the effect of the additional external force. A second method for providing a predetermined permanent deformation of one of the metal members such as the thicker metal member 25 is to pass a finished composite panel through a series of rollers A, B and C, as shown in FIGURE 6. The upper roller C, which is arranged in mating or seating relationship with rollers A and B, is movable in a vertical plane and exerts a downward force in the direction of the arrow D. Roller C, which can be applied either to a fully or partially cooled panel depending on the results desired, acts to effect the permanent deformation of the skin or covering 25 in the amount required to produce the requisite force that covering 25 is to apply to the core.

It is within the scope of this invention, if desired, to provide a panel with a predetermined bow in which event the method shown in FIGURE 5 may be used and/or metal members may be used which will impart a predetermined bow because the forces exerted on the core by the metal members are deliberately designed to be balanced with the panel being in a curved position.

While the particular examples set forth contemplate the use of aluminum or aluminum alloy metal members and plywood cores, it is, of course, obvious that other materials can be used for both the metal skin members and/or the core. For example, honeycomb core panels, asbestos, plastic and hardboard panels using stainless steel, aluminum and other metals as laminates can be made in accordance with this invention. These panels can be used in building construction, in shipping containers, in boats and, in general, wherever a strong composite panel might be desirable. The metal laminates can be made of different material from each other and they can be embossed, etched or striated.

One of the unique characteristics of the instant invention resides in the fact that it can be advantageously employed in the manufacture of unusually long composite panels which are usable in building constructions, etc. Heretofore long panels such as those made of plywood on the order of 10 feet or longer in standard widths for use as roofing and siding materials were relatively expensive to produce as compared to standard size plywood panels. In the case of long plywood roofing panels as conventionally used heretofore it was necessary to have the grain of the outside veneers arranged parallel to the longitudinal axis of the panel so that the grain of these outer veneers would run perpendicular to the rafters when the panels were emplaced and with the panels also being staggered with respect to each other for effective shear transfer.

By virtue of applying metal laminates in accordance with the instant invention to long plywood panels it is now economically practical to orient the outer ply veneers of a long plywood panel such that the direction of the grain is now transverse to the longitudinal axis of the panel without any sacrifice in panel strength. The overall result is a long panel which has sufficient strength in the long direction or along the major axis of the panel to provide for ease in handling and satisfactory application to roof structures.

Such a panel is shown in FIGURE 3 wherein the outer or majority of veneer layers 40 and 40' of plywood are so oriented that their grain is preferably substantially normal to the longitudinal axis of the panel, while the grain of the intermediate or inner veneer segments 42 is parallel to the longitudinal axis of the panel. In the past, such an orientation of plywood grain, while ordinarily being of advantage in that it allows utilization of material heretofore considered scrap, was disadvantageous in that such orientation of the grain placed it in a direction wherein the outer veneers 40 and 40' would be weakest when subjected to loads. By imposing predetermined balanced forces on both sides of the plywood core through the use of metal laminates in accordance with the instant invention, the overall plywood core is placed in a stressed condition along both the minor and major axis thereof.

Thus, in practicing the instant invention, two advantageous results flow from the application of metal skins of different thicknesses and tensile yield strengths to unusually long panels and in particular to unusually long metal clad plywood panels. In the first place, the forces exerted on each side of the core of the metal clad panel are balanced or stabilized with the finished panel having a predetermined configuration and, secondly, the bending moment of the panel when subjected to loads, particularly along its major axis, is substantially increased by virtue of the metal cladding.

It is to be further understood that the thicknesses of the various elements shown in the drawings are merely schematic and are not to scale.

While the present invention has been shown in a few form only, it will be obvious to those skilled in the art that various changes and modifications may be made therein without departing from the spirit and scope thereof as set forth in the appended claims, wherein what is claimed is:

1. A panel including a force-responsive plywood core having opposed first and second major faces, a first metal covering member non-shiftably bonded by a thermo-reacted glue to said first face, a second metal covering member firmly and non-shiftably bonded by a thermo-reacted glue to said second major face, said first and second metal covering member being selected from the group consisting of aluminum and aluminum alloys, said core and both of said metal covering members being in a stressed condition with one of said metal covering members being stressed beyond its tensile yield strength, said second metal covering member having a higher tensile yield strength than said first metal covering member, and a thickness between 0.0017 inch and 0.024 inch, said first metal covering member being between three and six times as thick as said second metal covering member, said relationships of said metal covering members being such that the force applied to the core by the first metal covering member in the panel is substantially equivalent to and counterbalanced by the force applied to the core by the second metal covering member, and said core being of a sufficient strength in its stressed condition that it responds to and resist the forces applied thereto.

2. A laminated article including a force-responsive core having opposed first and second major faces, a first metal covering member non-shiftably bonded by a thermo-reacted glue to said first major face, a second metal covering member non-shiftably bonded by a thermo-reacted glue to said second major face, said core and both of said metal members being in a stressed condition, said first and second metal members having higher coefficients of thermal expansion than said core, said first metal covering member having a lower tensile yield strength and greater thickness than said second metal covering member such that the force applied to the core by the first metal covering member in the article is substantially equivalent to and counterbalanced by the force applied to the core by the second metal covering member, and said core being of a sufficient strength in its stressed condition that it responds to and resists the forces applied thereto whereby the article has a predetermined configuration.

3. The article of claim 2 in which the metal members are selected from the group consisting of aluminum and aluminum alloys.

4. The article of claim 2 in which the metals are selected from the group consisting of aluminum and aluminum alloys and the first metal member is between three and six times as thick as the second metal member.

5. The article of claim 2 in which the core is plywood.

6. The article of claim 2 in which the metal members are aluminum and the core is plywood.

7. The article of claim 2 in which the thickness of the first metal member is between 0.010 inch and not greater than 0.072 inch.

8. The article of claim 2 in which the thickness of the second metal member is between 0.0017 inch and 0.024 inch.

9. The article of claim 2 in which one of said metal members of said article is stressed beyond its tensile yield strength.

10. The article of claim 2 in panel form having greater length than width, in which the core is plywood and has the grain of the majority of the plies thereof disposed transverse to the greatest dimension of said panel.

11. The method of making a composite article comprising the steps of providing a first metal member having a predetermined thickness and a predetermined tensile yield strength, providing a second metal member of less thickness and a greater tensile yield strength than said first metal member, interposing a force-responsive core having a lower coefficient of thermal expansion than either of said metal members between said first and second metal members, interposing between each metal member and a face of said core a thermo-reactive glue line, pressing said metal members, core and glue lines together into an assembly under the application of heat at a metal members-expanding temperature and non-shiftably bonding said metal members and core together in force-transmitting relationship after said metal members have been thermally expanded relative to said core, and thereafter transmitting forces from said metal members to the core by cooling said assembly.

12. The method of claim 11 in which the core is plywood.

13. The method of claim 11 in which the metal members-expanding temperature is at least 140° F.

14. The method of claim 11 in which the provided metal members are selected from the group consisting of aluminum and aluminum alloys.

15. In the method of claim 11, the step of applying an external deforming force to at least one of said metal members of said assembly.

16. In the method of claim 11, the step of stressing at least one of said metal members of said assembly beyond its tensile yield strength.

17. The method of making a composite article comprising the steps of providing a first metal member having a predetermined thickness and a predetermined tensile yield strength, providing a second metal member of less thickness and a greater tensile yield strength than said first metal member, said metal members being selected from the group consisting of aluminum and aluminum alloys, said first metal member having a thickness of at least 0.010 inch, interposing a force-responsive plywood core between said first and second metal members, interposing between each metal member and a face of said plywood core a thermo-reactive glue line, pressing said metal members, plywood core and glue lines together into an assembly under the application of heat at a metal members-expanding temperature above at least 140° F., and nonshiftably bonding said metal members and plywood core together in force-transmitting relationship after said metal members have been thermally expanded relative to said plywood core, and thereafter transmitting forces from said metal members to the core by cooling said assembly.

References Cited in the file of this patent
UNITED STATES PATENTS

| | | |
|---|---|---|
| 1,022,951 | Josz | Apr. 9, 1912 |
| 2,029,352 | Beckwith | Feb. 4, 1936 |
| 2,117,085 | Ensminger | May 10, 1938 |
| 2,318,184 | Rojas | May 4, 1943 |
| 2,479,342 | Gibbons et al. | Aug. 16, 1949 |
| 2,593,708 | Ware et al. | Apr. 22, 1952 |
| 2,757,116 | Clements | July 31, 1956 |
| 3,003,204 | Bryant | Oct. 10, 1961 |

UNITED STATES PATENT OFFICE

CERTIFICATE OF CORRECTION

Patent No. 3,127,304                                              March 31, 1964

Herbert H. Borup

It is hereby certified that error appears in the above numbered patent requiring correction and that the said Letters Patent should read as corrected below.

Column 4, line 6, for "inner" read -- thinner --; line 19, for "material", second occurrence, read -- materials --; column 5, line 17, for "ot" read -- to --; column 7, line 15, after "longer" insert -- and --; line 68, for "form" read -- forms --; column 8, line 4, for "member" read -- members --.

Signed and sealed this 17th day of November 1964.

(SEAL)
Attest:

ERNEST W. SWIDER                                        EDWARD J. BRENNER
Attesting Officer                                              Commissioner of Patents